United States Patent [19]
Cecil

[11] Patent Number: 5,831,235
[45] Date of Patent: Nov. 3, 1998

[54] APPARATUS AND METHOD OF WELDING A TUBE AND BRACKET ASSEMBLY

[76] Inventor: Dimitrios G. Cecil, 1277 Ashover Dr., Bloomfield Hills, Mich. 48304

[21] Appl. No.: 670,765

[22] Filed: Jun. 24, 1996

[51] Int. Cl.⁶ .......................... B23K 11/14; B23K 11/24
[52] U.S. Cl. ........................ 219/110; 219/67; 219/117.1
[58] Field of Search .................. 219/67, 86.41, 219/109, 110, 117.1, 157, 91.1

[56] References Cited

U.S. PATENT DOCUMENTS

| | | | |
|---|---|---|---|
| 3,433,921 | 3/1969 | Peterson | 219/110 |
| 3,435,871 | 4/1969 | Johnson | 151/41.7 |
| 3,509,306 | 4/1970 | Merchant | 219/87 |
| 3,628,832 | 12/1971 | Jennings | 297/451.1 |
| 4,028,522 | 6/1977 | Chihoski et al. | 219/109 |
| 4,214,142 | 7/1980 | Crosby et al. | 219/86.25 |
| 4,296,304 | 10/1981 | Defourny | 219/86.41 |
| 4,317,980 | 3/1982 | Goodrich et al. | 219/117.1 |
| 4,447,700 | 5/1984 | Cohen | 219/117.1 |
| 4,461,944 | 7/1984 | Cohen | 219/110 |
| 4,542,277 | 9/1985 | Cecil | 219/109 |
| 4,684,778 | 8/1987 | Cecil | 219/89 |
| 4,734,555 | 3/1988 | Ferguson | 219/109 |
| 4,841,113 | 6/1989 | Hamada et al. | 219/110 |
| 4,861,959 | 8/1989 | Cecil | 219/89 |
| 4,947,019 | 8/1990 | Akiyama et al. | 219/119 |
| 5,063,279 | 11/1991 | Rossi | 219/86.51 |
| 5,194,709 | 3/1993 | Ichikawa et al. | 219/109 |
| 5,220,145 | 6/1993 | Cecil et al. | 219/110 |
| 5,288,968 | 2/1994 | Cecil | 219/89 |
| 5,360,156 | 11/1994 | Ishizaka et al. | 228/17.5 |
| 5,376,766 | 12/1994 | Higgins | 219/61.5 |
| 5,393,950 | 2/1995 | Killian | 219/110 |
| 5,493,093 | 2/1996 | Cecil | 219/110 |
| 5,558,785 | 9/1996 | Killian et al. | 219/110 |

OTHER PUBLICATIONS

C.L. Tsai, W.L. Dai. D.W. Dickinson, "Anaylsis and Development of a Real–Time Control Methodology in Resistance Spot Welding", SAE Technical Paper Series No. 910191, Feb. 1991.

A. Stiebel, C. Ulmer, D. Kodrack and B. Holmes, "Monitoring and Control of Spot Weld Operations", SAE Technical Paper Series, No. 860579, Feb. 1986.

C.L. Tsai, W.L. Dai, D.W. Dickinson and J.C. Papritan, "Analysis and Development of a Real–Time Control Methodology in Resistance Spot Welding", Welding Research Supplement, Dec. 1991.

Lucas Schaevitz, LVDT (Linear Variable Displacement Transducer)Operating Instructions, Jul. 1994.

C.L. Tsai, O.A. Jammal, J.C. Papritan and D.W. Dickinson, "Modeling Resistance Spot Weld Nugget Growth", Welding Research Coucil, Bulletin 361, Feb. 1992, pp. 47–54.

David Bacon, "Controlling Resistance Welds With Deflection Feedback", Square D Company, Sep. 11, 1991.

A.E. Bentley, "Control of Pinch Welding Uses Quantitative Feedback Theory", Welding Journal, Jun. 1991, pp. pp. 51–63.

*Primary Examiner*—Gregory L. Mills
*Attorney, Agent, or Firm*—Brooks & Kushman P.C.

[57] ABSTRACT

An apparatus and method for welding a bracket to a tube are disclosed. A bracket having a semi-cylindrical portion with an inner surface and a radially inward projection extending from the inner surface is positioned adjacent to a tube with the semi-cylindrical portion of the bracket coaxially nested about the tube and with the radially inward projection engaging the tube at a faying surface. A resistance welding apparatus having a controller, an actuator, and a power supply is then provided. The power supply is coupled to the bracket and the tube through respective electrodes. A transducer cooperates with the electrodes to provide an output indicative of the position of the electrodes. A controller cooperates with the transducer and the power supply wherein the controller regulates the power output of the power supply as a function of the displacement between the electrodes to ensure that the bracket is properly welded to the tube. A tube and bracket assembly welded in accordance with the above described apparatus and method is also disclosed.

12 Claims, 4 Drawing Sheets

APPARATUS AND METHOD OF WELDING A TUBE AND BRACKET ASSEMBLY

TECHNICAL FIELD

The present invention relates generally to welding and, more particularly, to an apparatus and method of resistance projection welding.

BACKGROUND ART

Joining a bracket to a tube is a process that is performed in numerous applications such as in the manufacture of automobiles, refrigerant and air-conditioning systems. Since a defective tube and bracket assembly is expensive to replace once it is incorporated into a larger unit, it is imperative to ensure that the bracket is properly joined to the tube. Inclusion of defective assemblies into a line of systems, for example, can result in expensive repairs or product recall.

A problem in locating defective assemblies before they are incorporated into a larger unit is that they may only be identified through destructive testing. However, the assembly cannot be used again after destructive testing. Hence, destructive testing is only employed randomly on a group of assemblies to predict the occurrence of defective assemblies in the group. Because destructive testing is unreliable and wasteful, a defective assembly will probably not be discovered until its failure during operation.

Resistance brazing has been used in the past as a process in joining a bracket to a tube. In the resistance brazing process a filler metal is placed between the bracket and the tube. The bracket and the tube are then connected in electrical series to a pair of electrodes. The pair of electrodes then applies electrical current and pressure to the bracket and the tube. The filler metal heats up due to the resistance to the flow of current to reach a temperature high enough to begin melting. The current is then terminated allowing the filler metal to cool to coalesce with the bracket and the tube under the pressure from the pair of electrodes. Once the filler metal has solidified, the bracket is welded to the tube.

Another process used to join a bracket to a tube is resistance spot welding. The resistance spot welding process is similar to the resistance brazing process with the exception that filler metal is not used. Rather, the bracket and tube themselves are melted to coalesce directly with each other.

The weld strength between the bracket and the tube depends upon the amount of coalescence between the parts at the faying surface. The faying surface is the interface where the parts are welded together. In resistance brazing, the amount of coalescence depends upon the amount of penetration of each part with the filler metal. In resistance spot welding, the amount of coalescence depends upon the amount of penetration of the parts with each other. In either case, too much or too little coalescence will result in an improper weld. Although resistance brazing and resistance spot welding techniques can be used to properly join a bracket to a tube, a primary disadvantage associated with both of these processes is that weld strength varies dramatically from assembly to assembly due to changing surface conditions at the faying surface and variations in metallurgy.

The differences in the weld strength between the assemblies may also be a result of variations in the power applied to the parts due to such things as transient loading or surging of a transformer in the power supply even though a common schedule is programmed for a certain level of power. The differences may also be a result of variations in the pressure applied to the parts even though the common weld schedule is programmed for a certain level of pressure.

SUMMARY OF THE INVENTION

Accordingly, a resistance projection welding process configured to monitor and regulate the amount of penetration between a bracket and a tube at the faying surface during the welding process can be utilized to ensure that the bracket is properly welded to the tube.

It is an object of the present invention to provide a welding apparatus and method to regulate the power applied to the tube and bracket as a function of the penetration between the bracket and the tube at the faying surface to ensure that the bracket is properly welded to the tube.

It is another object of the present invention to provide a welding apparatus and method for ensuring that the tube and bracket assemblies that are improperly welded are identified.

It is still another object of the present invention to provide a welding apparatus and method for ensuring that the tube and bracket are in a proper fit-up position before applying power to the bracket and the tube.

In carrying out the above objects and other objects and features of the present invention, an apparatus for welding a bracket to a tube is provided. The apparatus includes a positioning fixture for positioning the bracket and the tube together. The bracket has a semi-cylindrical portion with an inner surface and a radially inward projection extending from the inner surface. The positioning fixture orients the semi-cylindrical portion of the bracket coaxially about the tube with the radially inward projection engaging the tube at a faying surface. A resistance welding apparatus having a controller, an actuator, and a power supply is also provided. The power supply is coupled to a pair of electrodes. One of the pair of electrodes cooperates with the tube. The other one of the pair of electrodes cooperates with the bracket. The pair of electrodes is shiftable relative to each other by the actuator. A transducer having an output indicative of the position of the pair of electrodes is further provided. A controller cooperates with the transducer and the power supply wherein the controller regulates the power output of the power supply as a function of the displacement between the pair of electrodes to ensure that the bracket is properly welded to the tube.

In accordance with the apparatus of the present invention, a method of welding a bracket to a tube is also provided. The method includes the step of positioning the bracket having a semi-cylindrical portion with an inner surface and a radially inward projection extending from the inner surface adjacent to the tube with the semi-cylindrical portion of the bracket coaxially nested about the tube and with the radially inward projection engaging the tube at a faying surface. A resistance welding apparatus having a controller, an actuator, and a power supply is then provided. The power supply is coupled to a pair of electrodes. One of the pair of electrodes cooperates with the tube. The other one of the pair of electrodes cooperates with the bracket. The pair of electrodes is shiftable relative to each other by the actuator. A position signal indicative of the position of the pair of electrodes is then generated. The bracket is then welded to the tube by having the controller utilize the position signal to regulate the power output of the power supply as a function of the displacement between the pair of electrodes to ensure that the bracket is properly welded to the tube.

The advantages accruing to the present invention are numerous. For example, the weld quality of a bracket joined to a tube can be ensured by detecting the physical characteristics of the tube and the bracket rather than relying on the skill of a welder or upon an automated system using a weld schedule which does not take into account the variances between the tube and the bracket or in the power supply conditions.

The above objects and other objects, features and advantages of the present invention will be readily appreciated by one of ordinary skill in the art from the following detailed description of the best modes for carrying out the invention when taken in conjunction with the accompanying drawings.

BEST MODES FOR CARRYING OUT THE INVENTION

Figure 1:
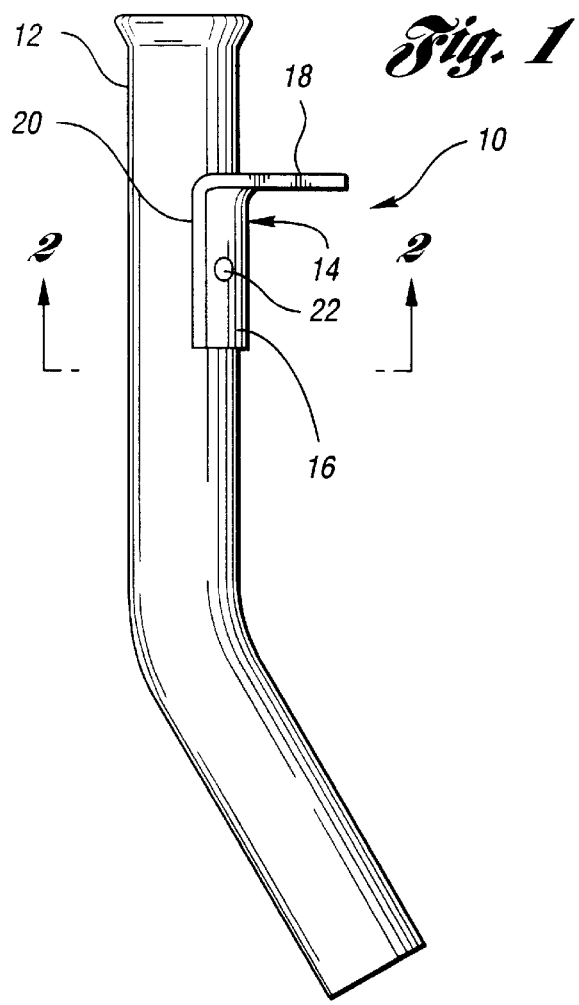
FIG. 1 is a perspective view of a tube and bracket assembly.

Referring now to FIG. 1, a perspective view of a tube and bracket assembly 10 is shown. Tube and bracket assembly 10 includes a tube 12 and a bracket 14. Bracket 14 is provided with a semi-cylindrical portion 16 and a tabular portion 18. Semi-cylindrical portion 16 has an inner surface 20 with a radially inward projection 22 extending from inner surface 20. Preferably, inner surface 20 has more than one radially inward projection extending therefrom.

Bracket 14 and tube 12 are positioned together with semi-cylindrical portion 16 being coaxially nested about tube 12 and with radially inward projection 22 engaging tube 12 at the faying surface. The faying surface is the interface where semi-cylindrical portion 16 is welded to tube 12. As will be described in detail below, radially inward projection 22 melts to define a weld nugget site at the faying surface as bracket 14 is resistance welded to tube 12 in accordance with an apparatus and method of the present invention. The apparatus and method of the present invention are configured to ensure that bracket 14 is properly welded to tube 12.

Figure 2:
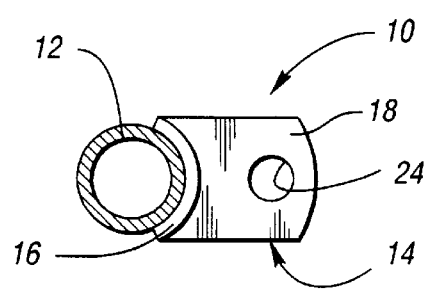
FIG. 2 is a view of the tube and bracket assembly along the line 2—2 shown in FIG. 1.

Referring now to FIG. 2, a view of tube and bracket assembly 10 is shown along the line 2—2 of FIG. 1. As shown in FIG. 2, semi-cylindrical portion 16 is most preferably coaxially nested 150° about the circumference of tube 12. Preferably, semi-cylindrical portion 16 is coaxially nested 120° to 160° about the circumference of tube 12.

Tabular portion 18 extends away from semi-cylindrical portion 16 and tube 12. Tabular portion 18 has an aperture 24 located therein to facilitate securing tube and bracket assembly 10 with a fastener to a desired location.

Figure 3:
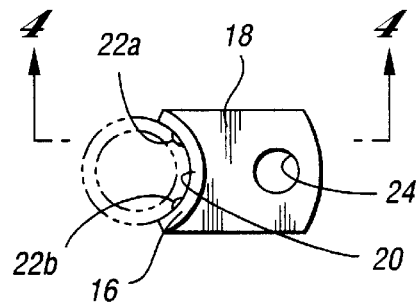
FIG. 3 is a view of the bracket illustrating the radially inward projections extending from the inner surface of the semi-cylindrical portion of the bracket.

Referring now to FIG. 3, a view of bracket 14 illustrating radially inward projection 22a and 22b extending from inner surface 20 of semi-cylindrical portion 16 of bracket 14 is shown. The maximum number of radially inward projections extending from inner surface 20 of semi-cylindrical portion 16 is a function of the area needed to develop a weld nugget site. The weld nugget site is where the radially inward projection has coalesced with the tube at the faying surface. Each weld nugget site must be separated from other sites so as to avoid heat developed at one faying surface from improperly heating up an adjacent faying surface. Thus, the projections are preferably spread across inner surface 20 far enough from each other so that the weld nugget sites do not overlap as the projections melt. For simplicity, only two radially inward projections 22a and 22b extending from inner surface 20 are shown in FIG. 3.

Figure 4:
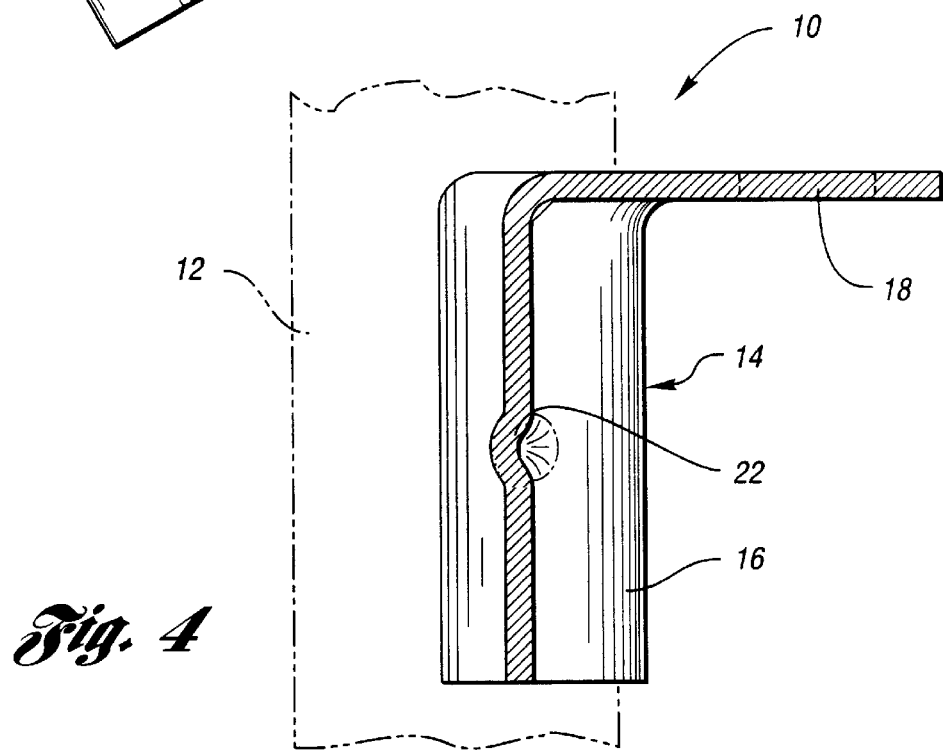
FIG. 4 is a view of the bracket highlighting a radially inward projection.

Referring now to FIG. 4, a view of bracket 14 highlighting radially inward projection 22 extending from inner surface 20 along the line 4—4 of FIG. 3 is shown. Radially inward projection 22 is a round button or dome type of projection. As known in the art, the dimensions of radially inward projection 22 are optimally designed in accordance with the type and thicknesses of the materials to be welded. Furthermore, the dimensions of the projections are consistently the same among a group of brackets. The present invention takes advantage of the consistency to ensure that each bracket is properly welded to a tube as will be described in detail below.

Figure 5:
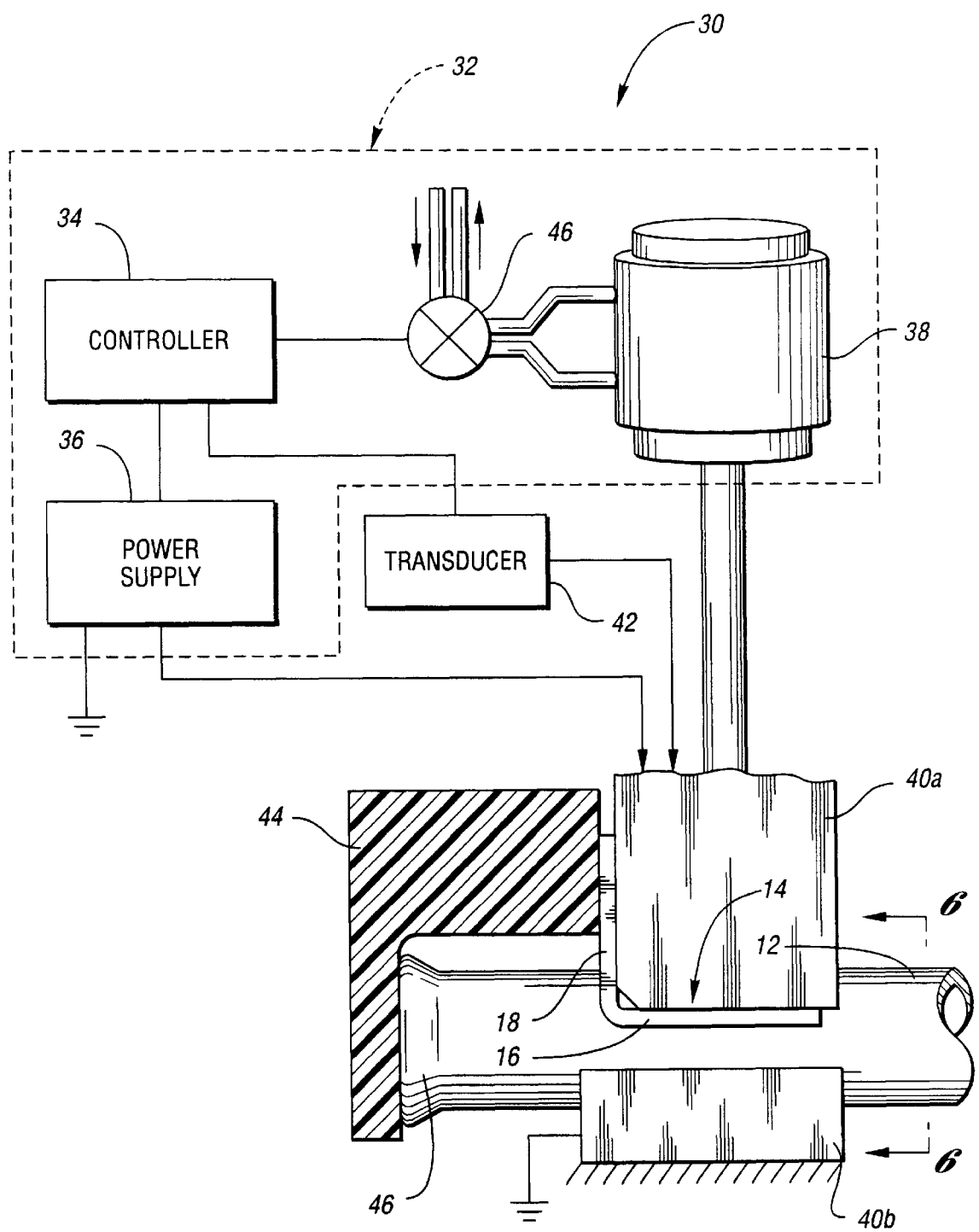
FIG. 5 is a schematic block diagram illustrating a welding apparatus according to the present invention.

A schematic block diagram illustrating an apparatus 30 configured to monitor and regulate the amount of penetration between bracket 14 and tube 12 at the faying surface is shown in FIG. 5. Apparatus 30 includes a resistance welding apparatus 32. Resistance welding apparatus 32 includes a controller 34, a resistance heating power supply 36, and an actuator 38.

Power supply 36 is a readily obtainable component from various welding component manufacturers such as Weltronic, Medar, or Square D. Power supply 36 is coupled to a pair of electrodes 40a and 40b. One of the pair of electrodes 40a cooperates with bracket 14 and the other one of the pair of electrodes 40b cooperates with tube 12. Pair of electrodes 40a and 40b are shiftable relative to each other by actuator 38.

Pair of electrodes 40a and 40b are shifted by actuator 38 to force semi-cylindrical portion 16 to be coaxially nested about tube 12. When pair of electrodes 40a and 40b are shifted together to force semi-cylindrical portion 16 against tube 12, a closed electrical circuit is formed between power supply 36, bracket 14, and tube 12. Hence, power output from power supply 36 may then be applied to heat the faying surface, i.e., the interface between radially inward projection 22 and tube 12. Pair of electrodes 40a and 40b are movable relative to each other to track the amount of penetration between bracket 14 and tube 12 at the faying surface when the power is applied. Since pair of electrodes 40a and 40b are in respective direct contact with bracket 14 and tube 12, the amount of penetration between bracket 14 and tube 12 at the faying surface is equal to the displacement between pair of electrodes 40a and 40b.

In a preferred embodiment as shown in FIG. 5, electrode 40b is fixed while electrode 40a is movable. Of course, electrode 40a may be fixed while electrode 40b is movable or both of pair of electrodes 40a and 40b may be movable relative to each other.

Apparatus 30 includes a transducer 42 operative with pair of electrodes 40a and 40b. Transducer 42 provides an output indicative of the position of pair of electrodes 40a and 40b. Transducer 42 is a sensor such as a Linear Variable Displacement Transducer (LVDT) described in U.S. Pat. Nos. 5,288,968; 5,220,145; 4,684,778; and 4,542,277; all of which are issued to the present Applicant, which are incorporated herein for the purpose of describing transducer 42 and related control logic.

Controller 34 cooperates with transducer 42 to determine the position of pair of electrodes 40a and 40b. After actuator 38 shifts pair of electrodes 40a and 40b to force semi-cylindrical portion 16 to be coaxially nested about tube 12 and after power supply 36 applies power, controller 34 monitors the displacement between pair of electrodes 40a and 40b to regulate the power output of power supply 36. By knowing the position of pair of electrodes 40a and 40b, controller 34 can determine the displacement between pair of electrodes 40a and 40b since the displacement is simply the change in position of electrodes 40a and 40b.

Controller 34 regulates the power output of power supply 36 as a function of the displacement between pair of electrodes 40a and 40b to ensure that bracket 14 is properly welded to tube 12. The power applied by power supply 36 may be AC or DC electrical power. It may also take a variety of input patterns such as pulse, ramp, sinusoidal, sawtooth, etc. depending upon the application and the thicknesses and type of materials utilized.

Apparatus 30 further includes a positioning fixture 44. Positioning fixture 44 locates bracket 14 on tube 12 by abutting tabular portion 18 of bracket 14 and a flared out portion 46 of tube 12. Positioning fixture 44 may be adjusted to locate bracket 14 farther away or closer to flared out portion 46. Positioning fixture 44 is utilized to precisely and quickly locate bracket 14 on tube 12 to facilitate mass production of tube and bracket assembly 10.

Controller 34 cooperates with actuator 38 to regulate its movement. In a preferred embodiment, resistance welding apparatus 32 further includes a pressure regulator 46 for varying the force exerted by pair of electrodes 40a and 40b. Controller 34 cooperates with pressure regulator 46 and actuator 38 to vary the force on pair of electrodes 40a and 40b in real time as a function of the displacement between pair of electrodes 40a and 40b during the welding procedure to ensure that bracket 14 is properly welded to tube 12.

Figure 6:
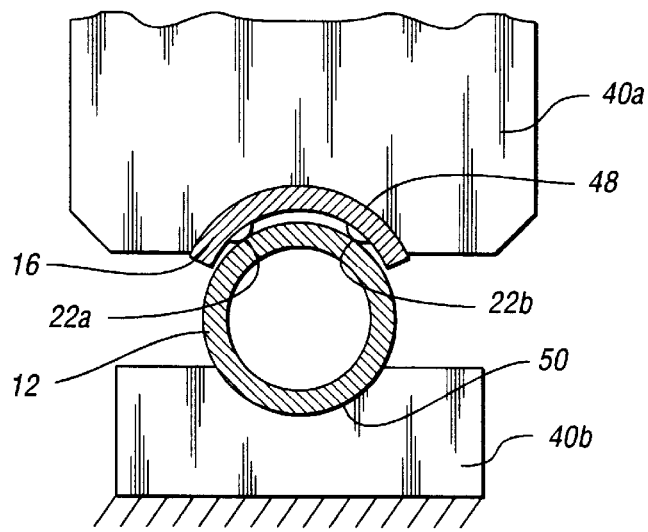
FIG. 6 is a cross-sectional view along the line 6—6 shown in FIG. 5.

Referring now to FIG. 6, a cross-sectional view is shown along the line 6—6 of FIG. 5. Electrode 40a has an arcuate contact face 48 shaped to cooperate with semi-cylindrical portion 16. Similarly, electrode 40b has an arcuate contact face 50 shaped to cooperate with tube 12. Each of arcuate contact faces 48 and 50 have an arcuate angle sufficiently large enough to distribute the pressure applied by pair of electrodes 40a and 40b evenly across semi-cylindrical portion 16 and tube 12. This prevents deformation of tube 12 during the application of pressure to minimize tube flexing and undesired movement between semi-cylindrical portion 16 and tube 12. This also ensures that radially inward projections 22a and 22b will be precisely located to engage tube 12.

Preferably, arcuate contact face 48 of electrode 40a has an arcuate angle between 90° and 120° of the circumference of semi-cylindrical portion 16. Similarly, arcuate contact face 50 of electrode 40b has an arcuate angle between 90° and 120° of the circumference of tube 12.

Figure 7:
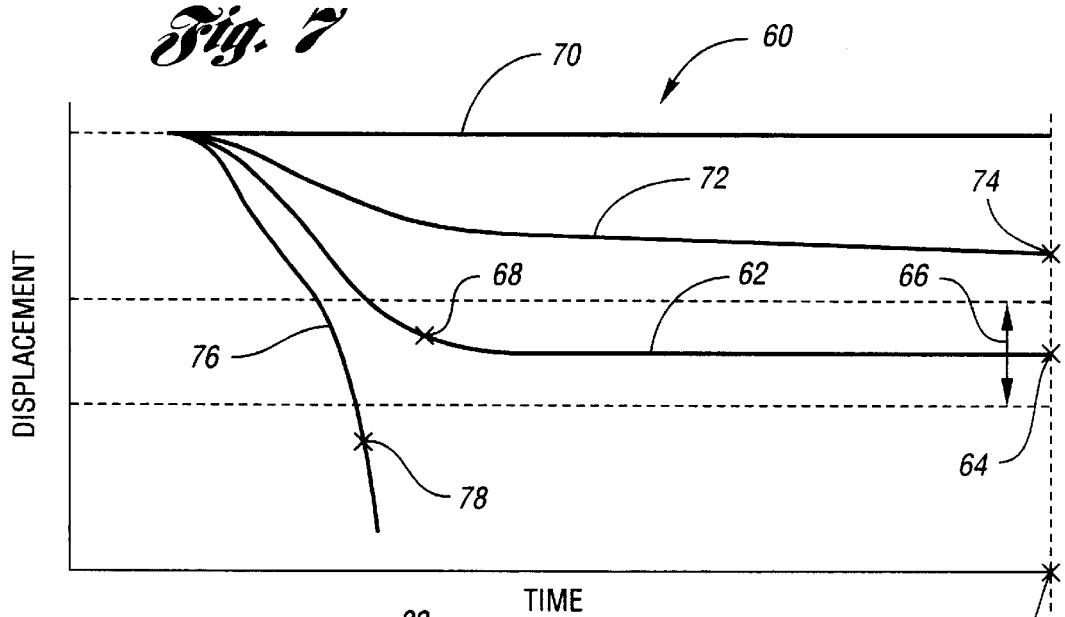
FIG. 7 is a graph illustrating a series of curves which compare a proper weld to three weld fault conditions by tracking the displacement between a pair of electrodes over time.

Referring now to FIG. 7, a graph 60 illustrating a series of curves comparing a proper weld to three weld fault conditions by tracking the displacement between pair of electrodes 40a and 40b over time is shown. As mentioned above, the displacement between pair of electrodes 40a and 40b is equal to the amount of penetration between bracket 14 and tube 12 at the faying surface.

Proper displacement curve 62 represents a proper weld as indicated by a final displacement point 64 falling within a predetermined displacement range 66. A final displacement falling within predetermined displacement range 66 is defined as a proper weld between bracket 14 and tube 12. In order to ensure a proper weld, controller 34 terminates the power output of power supply 36 around termination point 68. After termination of the power, radially inward projection 22 slightly penetrates tube 12 further at the faying surface to reach final displacement point 64 as it cools. Thus, terminating the power output of power supply 36 when the displacement between pair of electrodes 40a and 40b falls within predetermined displacement range 66 will ensure a proper weld between bracket 14 and tube 12.

Controller 34 also monitors the displacement between pair of electrodes 40a and 40b to identify improper welds between bracket 14 and tube 12. For instance, zero displacement curve 70 represents no penetration of radially inward projection 22 into tube 12 at the faying surface. Hence, bracket 14 and tube 12 are not welded together. This condition occurs when bracket 14 and tube 12 have not been subjected to power output from power supply 36. Usually, power has not been applied because bracket 14 and tube 12 are not forced together to form a closed electrical circuit or because power supply 36 is inoperable. In any event, controller 34 recognizes that no displacement after the expiration of a predetermined time limit 71 is not within predetermined displacement range 66 and it will indicate a fault condition.

A second fault condition is represented by slight displacement curve 72. Slight displacement curve 72 represents the condition of radially inward projection 22 not penetrating far enough into tube 12. For example, slight displacement curve 72 has a final marginal displacement point 74 after the expiration of predetermined time limit 71. This condition occurs because of the presence of contaminants on the parts or electrodes inhibiting the flow of current from power supply 36. Controller 34 recognizes that the value of final marginal displacement point 74 falls outside of predetermined displacement range 66 and it will indicate a fault condition.

Finally, a third fault condition is represented by excessive displacement curve 76. Excessive displacement curve 76 represents the condition of radially inward projection 22 penetrating too far into tube 12 at the faying surface. Depending on the rate of displacement, this condition is known as over penetration or expulsion. Either of these conditions occur when the parts are subjected to an excessive amount of power output from power supply 36. Controller 34 recognizes this condition when the displacement between pair of electrodes 40a and 40b exceeds predetermined displacement range 66. Once the displacement is excessive, the controller terminates the power output from power output 36 at a point such as excessive displacement point 78. Controller 34 will then indicate a fault condition.

Figure 8:
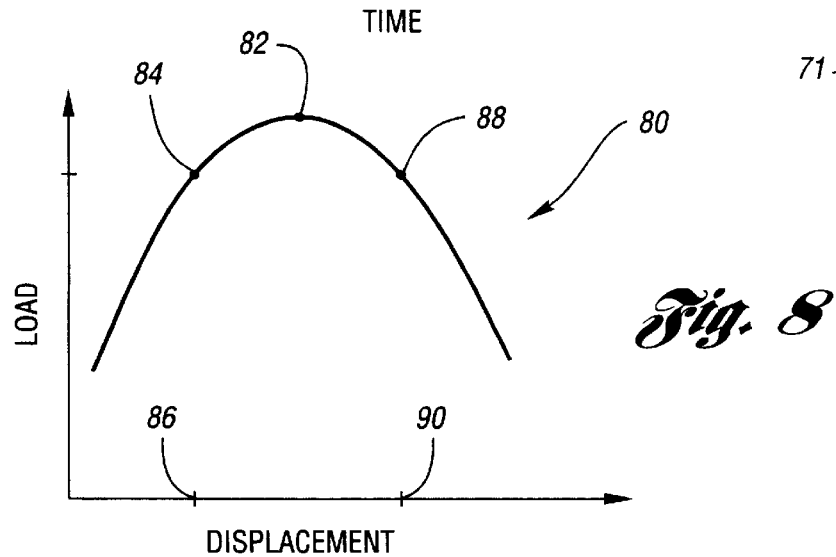
FIG. 8 is a graph illustrating the displacement between the electrodes versus load strength of the weld.

With continuing reference to FIG. 7, FIG. 8 shows a load graph 80 illustrating how the strength of a weld between bracket 14 and tube 12 is dependent upon the amount of displacement between pair of electrodes 40a and 40b. As indicated previously, the displacement between electrodes pair of 40a and 40b equals the penetration between bracket 14 and tube 12 at the faying surface. A maximum strength point 82 is obtained when the displacement between pair of electrodes 40a and 40b ends at final displacement point 64 on proper displacement curve 62. If the final displacement between pair of electrodes 40a and 40b is at a point on the boundary of predetermined displacement range 66 above final displacement point 64, then a first minimum strength point 84 is obtained at minimum displacement point 86. Similarly, if the final displacement between pair of electrodes 40a and 40b is at a point on the boundary of predetermined displacement range 66 below final displacement point 64, then a second minimum strength point 88 is obtained at maximum displacement point 90.

Thus, if the specifications of the application call for the strength of the weld to be above minimum strength points 84 and 88, a displacement falling within predetermined displacement range 66 will meet the specifications. The displacement will fall within predetermined displacement range 66 when it lies between minimum displacement point 86 and maximum displacement point 90.

Figure 9:
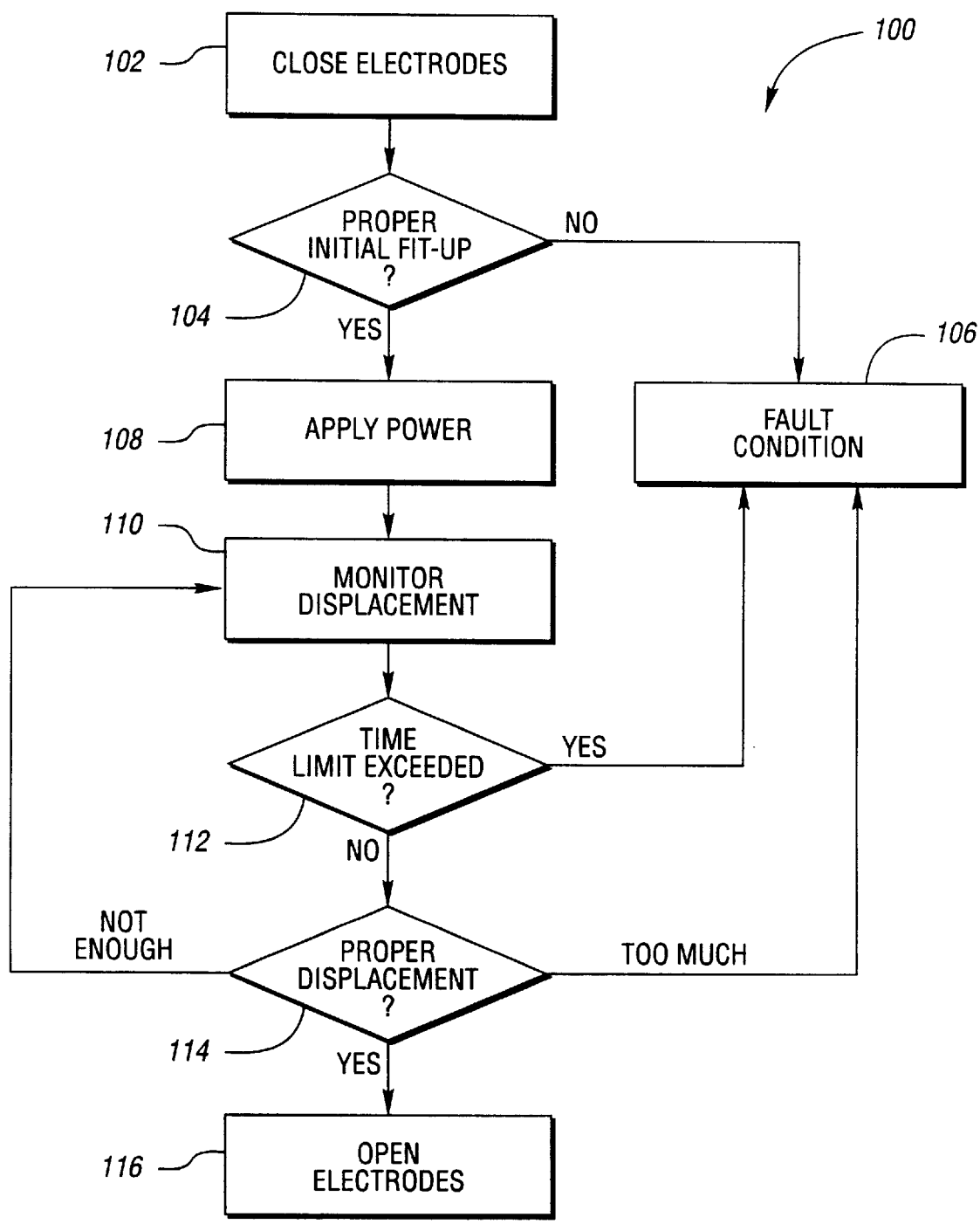
FIG. 9 is a flow chart illustrating a method of welding according to the present invention.

Referring now to FIG. 9 with continuing reference to FIG. 5, a flow chart 100 illustrating the operation of apparatus 30 in further detail is shown. The first step of flow chart 100 is for actuator 38 to shift pair of electrodes 40a and 40b together to force semi-cylindrical portion 16 against tube 12 thereby forming a closed electrical circuit as indicated by close electrodes block 102. Controller 34 then monitors the position of pair of electrodes 40a and 40b to determine whether the distance between pair of electrodes 40a and 40b falls within a predetermined initial fit-up range as indicated by proper initial fit-up? block 104. If the distance between pair of electrodes 40a and 40b falls outside of the predetermined initial fit-up range then controller 34 inhibits the power output from power supply 36 and indicates a fault condition as indicated by fault condition block 106. If the distance between pair of electrodes 40a and 40b falls within the predetermined initial fit-up range then controller 34 instructs power supply 36 to apply power as indicated by apply power block 108.

Controller 34 cooperates with transducer 42 to monitor the position of pair of electrodes 40a and 40b as indicated by monitor displacement block 110. Controller 34 terminates the power output from power supply 36 after expiration of the predetermined time limit as indicated by time limit exceeded? block 112 and indicates the appropriate fault condition as indicated by fault condition block 106. If the predetermined time limit has not expired, controller 34 determines whether the displacement between pair of electrodes 40a and 40b falls within predetermined displacement range 66 as indicated by proper displacement? block 114. If the displacement is excessive, then controller 34 terminates the power output from power supply 36 and indicates a fault condition as indicated by fault condition block 106. If the displacement is not enough and the predetermined time limit has not expired, then controller 34 continues on monitoring the displacement between pair of electrodes 40a and 40b as indicated by monitor displacement block 110. Finally, if the displacement falls within predetermined displacement range 66, then controller 34 terminates the power output from power supply 36 and commands actuator 38 to shift pair of electrodes 40a and 40b to an open position as indicated by open electrodes block 116.

In a preferred embodiment, the operation of apparatus 30 further includes the step of controller 34 monitoring the displacement to check for a "stuck gun" condition. A stuck gun condition occurs when at least one of electrodes 40a and 40b are fused to a workpiece surface. Controller 34 checks for the stuck gun condition in a manner similar to that shown in U.S. Pat. No. 5,493,093 which is incorporated herein by reference and was issued to the present Applicant. If controller 34 detects a stuck gun condition, then it activates a stuck gun alarm and commands actuator 38 to halt shifting electrodes 40a and 40b to the open position until the condition is corrected.

It is to be understood, of course, that while the forms of the present invention described above constitute the preferred embodiments of the present invention, the preceding description is not intended to illustrate all possible forms thereof. It is also to be understood that the words used are words of description, rather than limitation, and that various changes may be made without departing from the spirit and scope of the present invention, which should be construed according to the following claims.

What is claimed is:

1. An apparatus for welding a bracket to a tube, the apparatus comprising;

a positioning fixture for positioning the bracket and the tube together, the bracket having a semi-cylindrical portion with an inner surface and a radially inward projection extending from the inner surface, the positioning fixture orienting the semi-cylindrical portion of the bracket coaxially about the tube with the radially inward projection engaging the tube at a faying surface;

a resistance welding apparatus having a controller, an actuator, and a power supply, the power supply being coupled to a pair of electrodes for providing power output thereto, one of the pair of electrodes cooperating with the tube and the other one of the pair of electrodes cooperating with the bracket, the pair of electrodes being shiftable relative to each other by the actuator;

a pressure regulator cooperating with the actuator for varying a force exerted by the pair of electrodes on the tube and the bracket;

a transducer having an output indicative of a position of the pair of electrodes; and the controller cooperating with the transducer, the pressure regulator, and the power supply, wherein the controller regulates the power output of the power supply and the force exerted by the pair of electrodes on the tube and the bracket as a function of displacement between the pair of electrodes to ensure that the bracket is properly welded to the tube.

2. The apparatus of claim 1 wherein the controller cooperates with the transducer and the power supply to inhibit the power output of the power supply if the distance between the pair of electrodes falls outside of an initial fit-up range.

3. The apparatus of claim 1 wherein the controller cooperates with the transducer and the power supply to terminate the power output of the power supply after expiration of a predetermined time limit.

4. The apparatus of claim 1 wherein the controller cooperates with the transducer and the power supply to terminate the power output of the power supply when the displacement between the pair of electrodes is indicative of a fault condition of over penetration.

5. The apparatus of claim 1 wherein the controller cooperates with the transducer and the power supply to terminate the power output of the power supply when the displacement between the pair of electrodes falls within a predetermined displacement range indicative of properly welding the bracket to the tube.

6. The apparatus of claim 1 wherein the controller regulates the power output of the power supply by varying power level and power duration.

7. A method of welding a bracket to a tube, the method comprising the steps of:

positioning the bracket having a semi-cylindrical portion with an inner surface and a radially inward projection extending from the inner surface adjacent to the tube with the semi-cylindrical portion of the bracket coaxially nested about the tube and with the radially inward projection engaging the tube at a faying surface;

providing a resistance welding apparatus having a controller, an actuator, and a power supply, the power supply being coupled to a pair of electrodes for providing power output thereto, one of the pair of electrodes cooperating with the tube and the other one of the pair of electrodes cooperating with the bracket, the pair of electrodes being shiftable relative to each other by the actuator;

generating a position signal indicative of a position of the pair of electrodes; and welding the bracket to the tube by having the controller utilize the position signal to regulate the power output of the power supply and a force exerted by the pair of electrodes on the tube and the bracket as a function of the displacement between the pair of electrodes to ensure that the bracket is properly welded to the tube.

8. The method of claim 7 further comprising the step of inhibiting the power output of the power supply if the distance between the pair of electrodes falls outside of a predetermined initial fit-up range.

9. The method of claim 7 further comprising the step of terminating the power output of the power supply after expiration of a predetermined time limit.

10. The method of claim 7 further comprising the step of terminating the power output of the power supply when the displacement between the pair of electrodes is indicative of a fault condition of over penetration.

11. The method of claim 7 further comprising the step of terminating the power output of the power supply when the displacement between the pair of electrodes falls within a predetermined displacement range indicative of properly welding the bracket to the tube.

12. The method of claim 7 wherein the step of regulating the power output of the power supply with the controller includes the step of varying power level and power duration.

* * * * *